Figure 1:
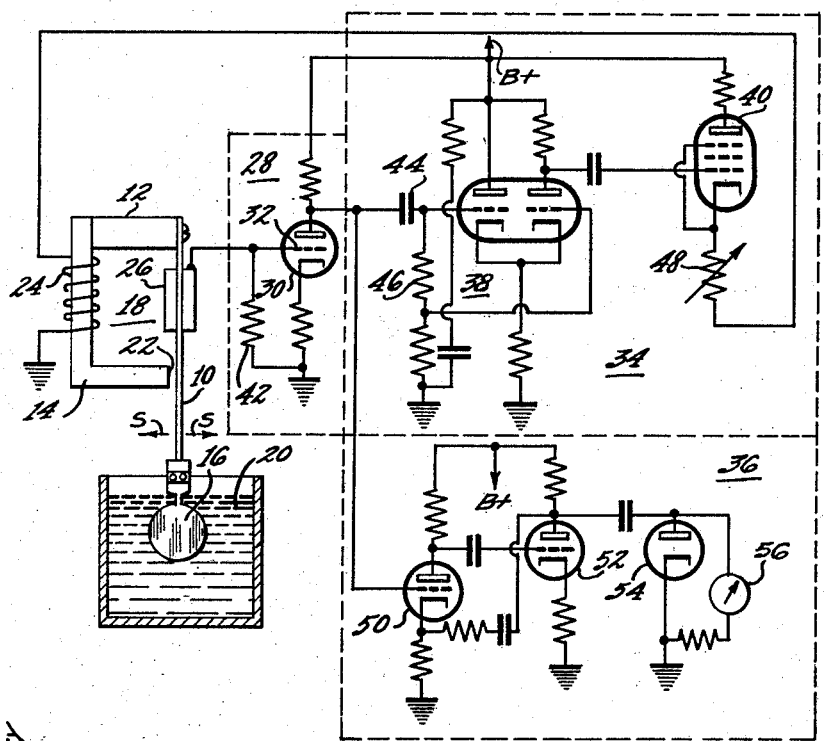

Dec. 14, 1954  J. G. WOODWARD  2,696,735
VIBRATING PLATE VISCOMETER
Filed May 24, 1951

INVENTOR
J. Guy Woodward
BY
ATTORNEY

United States Patent Office 2,696,735
Patented Dec. 14, 1954

2,696,735

VIBRATING PLATE VISCOMETER

J. Guy Woodward, Lawrenceville, N. J., assignor to Radio Corporation of America, a corporation of Delaware Application May 24, 1951, Serial No. 228,037

12 Claims. (Cl. 73—59)

This invention relates to improvements in viscometers, and particularly to an improved viscometer of the type utilizing a vibratory element adapted to be immersed in a sample of the fluid under investigation. For convenience, viscometers of this type are referred to herein as "vibrating plate viscometers."

The importance of the coefficient of viscosity of a liquid as an index of certain of its physical properties is well recognized, and a number of instruments for measuring liquid viscosity have been devised and are in use in laboratories and in industrial processing plants. Among those most commonly used, mentioned may be made of the capillary tube type, the falling sphere type, and the rotational type. In the petroleum industry the relative viscosities of oils are often expressed simply as the number of seconds required for a standardized volume of the liquid to flow from a cup through a standardized orifice. This type of viscometer is similar in principle to the capillary type. Many other instruments have been devised to give indications of the viscous properties of fluids. Some of these are viscometers in the true sense of the word. Others are used in a prescribed technique to give purely empirical results indicative of the behavior of a particular substance, such as printers' ink, in actual use. The property measured in such cases is not necessarily viscosity, but it is closely related to viscosity, and may be referred to by such terms as "tackiness" or "consistency."

A vibrating plate viscometer, such as is described herein, operates on a principle quite different from any of those mentioned above.

Briefly, a vibrating plate viscometer of the type with which the present invention is concerned comprises an element which is caused to vibrate in a sample of the liquid being examined to set up shear waves in the liquid. The liquid will cause viscous damping of the vibratory movement, in an amount related to the coefficient of viscosity of the liquid. It is a general object of the present invention to provide an improved viscometer of this type.

As will be explained shortly, the frequency at which a vibrating plate viscometer operates is of prime importance. It is an important object of the present invention to provide a vibrating plate viscometer wherein the operating frequency is automatically maintained at the proper value.

Ancillary objects of the invention are to provide in a vibrating plate viscometer, an improved and simplified construction of the vibratory element and of the element driving system, as well as a simple and efficient arrangement for measuring the vibrating plate motion and for controlling operation of the apparatus.

Figure 2:
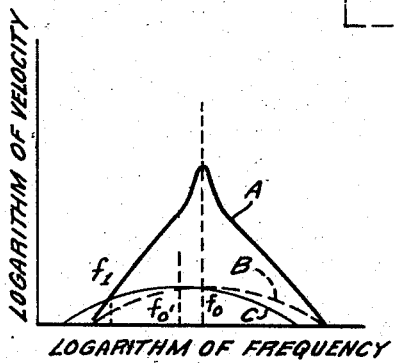
Figure 3:
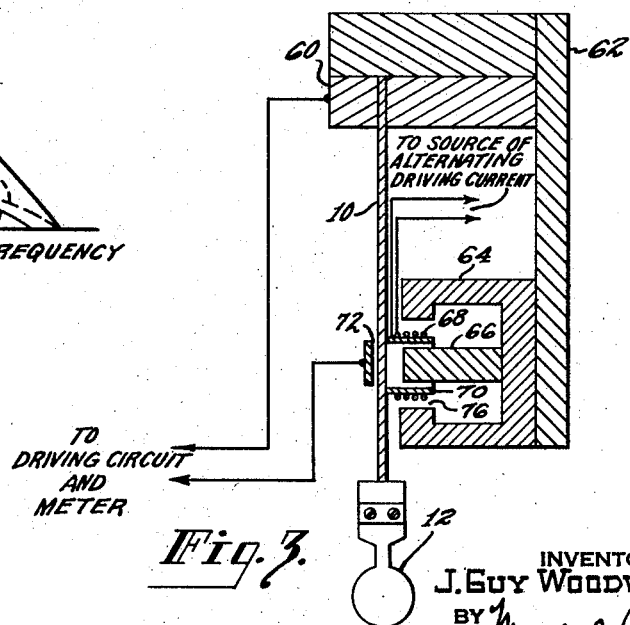

In accordance with one feature of the invention, operation of a vibrating plate viscometer at the proper operating frequency is insured by the provision of frequency-control feedback between the driven element and the driving circuit, so that the proper driving frequency will be maintained notwithstanding changed requirements arising from differing characteristics of the liquid test samples. Further features of the invention are set out in the following description of illustrative embodiments thereof, which is to be read in connection with the accompanying drawing wherein:

Fig. 1 is a schematic diagram of a vibrating plate viscometer arranged in accordance with the invention, Fig. 2 is a graph illustrating resonance characteristics of a vibratory system such as is involved in the viscometer described herein, and Fig. 3 is a cross-section view of an alternative electromechanical driver mechanism.

In the viscometer system shown in Fig. 1 of the drawing, a vibrating element is provided comprising a flat reed 10, clamped at one end to a block 12 which is fixed to an L-shaped pole piece 14. To the free end of the reed 10 is attached a thin, essentially circular plate 16, the plane of the plate being perpendicular to that of the reed. The reed 10 is of steel or similar material, and forms part of the magnetic circuit of an electromagnetic driving system 18, which is energized to cause the reed to vibrate at the frequency of its mechanical resonance, as explained hereinafter. As the reed vibrates, the circular plate will swing back and forth in its own plane, as indicated by the arrows S.

In a typical embodiment of the system 18, the reed 10 was of the order of 0.875 inch long, 0.2 inch wide and 0.01 inch thick. The plate or blade 16 was a beryllium copper disc of 0.2 inch diameter and 0.01 inch thick. It will be understood that these dimensions are illustrative only. While not strictly essential, a circular shaped blade is preferable as it gives maximum area for a given length of periphery and hence minimizes any edge effects which might encourage turbulence in the liquid.

The electromagnetic driving system 18 comprises the L-shaped pole piece 14 which extends from the clamping block 12, at the base of the reed 10, to a small air gap 22 near the free end of the reed. A coil 24, wound on a form (not shown) which fits around the pole piece 14, is supplied both with direct current for magnetic polarization and with fluctuating current of the proper frequency to drive the vibrating system at resonance, from a circuit to be described hereinafter. When fluctuating current passes through the coil 24, the reed 10 and blade 16 will vibrate in the direction indicated by the double arrows S. If no magnetic polarizing flux is provided, the frequency of vibration will be twice the frequency of fluctuation of the current. If polarizing flux is provided, the frequency of vibration will be the same as that of the fluctuating current. Either type of operation is satisfactory, although in the present instance a polarizing flux is used because the driving current fluctuations are derived directly from the signal generated by the vibrating plate, so that the simplest arrangement is to have the frequency of vibration the same as that of the driving current.

It is to be understood that the term "fluctuating current" is used herein to mean either a unidirectional current having a periodically varying or undulating component, or a so-called alternating current in which the direction of current flow periodically reverses. In either case, it is, of course, the fluctuating component that sets up the varying magnetic flux which imparts motion to the vibrating element.

When the blade 16 is immersed in a liquid 20, shear waves are set up in the body of the liquid and the blade is subjected to viscous damping by the liquid. The viscous damping reduces the amplitude of vibration of the reed, and the amount of this reduction is related to the coefficient of viscosity of the liquid, as will now be explained.

Throughout the following discussion, "$\rho$" will represent the density of the liquid under test, and "$\mu$" will represent the coefficient of viscosity.

As is well known, every practical vibrating system is inevitably resonant at one or more frequencies. At resonance, the reactive components of mechanical impedance are zero, so that the mechanical impedance is purely resistive. Thus, if the blade 16 in the appartus of Fig. 1 is caused to vibrate at resonance in air, the amplitude of the blade motion will be indicative of the overall mechanical resistance of the system.

It can be shown that when a surface vibrates in a viscous liquid in a manner to set up shear waves in the liquid, the liquid offers a retarding force to the motion of the surface of an amount proportional to the quantity $\sqrt{f\mu\rho}\,(1+j)$, where $f$ is the frequency of vibration. This is a complex force composed of two parts;

a dissipative or resistive force, proportional to $\sqrt{f\mu\rho}$, which damps the vibratory motion, and a reactive force, also proportional to $\sqrt{f\mu\rho}$, which adds to the effective mass of the vibrating system.

Therefore, when the blade 16 is immersed in the liquid 20, a resistive component will be added to the system to limit the amplitude of blade motion, and this component will be proportional to the item of interest, $\mu$. However, the reactive component of the retarding force imposed by the liquid must be considered.

If a system such as that being discussed is driven with an alternating force of constant magnitude, the R. M. S. velocity of the resulting motion as a function of the frequency of the driving force can be represented by a curve, such as cure A in Fig. 2 of the drawing. In curve A, resonance occurs at a frequency $f_o$. If the system is loaded by a pure mechanical resistance, the response would be lower as represented by curve B in Fig. 2, with the resonance frequency still very close to $f_o$. However, if the load is not purely resistive, as in the case of viscuous liquid load, the resonance will be lowered in frequency, so that the total effect of a viscous liquid would result in a curve such as curve C in Fig. 2, with the resonance at $f_o'$. At some frequency $f_L$ well below resonance, curve C crosses A, and for still lower frequencies the velocities for C are greater than for A, so that the liquid loading would actually increase the amplitude of blade motion in that range of frequencies. A similar state of affairs exists for frequencies above resonance, although in this case the response for curve C will always be less than for curve A.

From the foregoing, it can be seen that a measure of the damping effect of a liquid on a vibrating element will provide a measure of the viscosity of the liquid, but that ambiguity will exist if one attempts to measure the viscous load at any frequency other than the frequency of resonance of the combined system including the load. Therefore, it is important that the system always be operated at resonance as determined by all effective system parameters. This point will be considered further in connection with the driving circuit for the system.

In the embodiment of the invention shown in Fig. 1, the blade motion is measured by measuring the alternating voltage generated by piezoelectric blocks 26 of barium titanate mounted on the faces of the reed 10.

The properties of barium titanate and its use in mechanoelectric transducers have been discussed in detail elsewhere (see, e. g., H. W. Koren—"Application of Activated Ceramics to Transducers," Jour. Acous. Soc. Am. 21;198, May 1949). Barium titanate blocks used with a reed of the dimensions previously given may be of the order of 0.590-inch long by 0.150-inch wide by 0.015 inch thick, with fired-on silver electrodes on their faces. The two blocks can be soft-soldered on opposite sides of the reed. This configuration is often referred to as a "bimorph." Flexing of the "bimorph" as a result of reed vibration develops an E. M. F. at the electrodes which can be measured as a measure of blade motion and, hence, of viscosity.

Before proceeding to a discussion of the electrical circuit of the viscometer of Fig. 1, one further point of general interest may be noted in connection with the vibrating reed and blade.

It is well known that a reed clamped at one end and free at the other has a theoretically infinite number of modes of vibration, each with its particular frequency. Other modes of vibration, in addition to and quite distinct from those for the clamped-free unloaded reed arise when the free end of the reed carries a load having rotational inertia. There are now two modes for each of those formerly existing.

The frequency of the lowest mode of the unloaded reed lies between the frequencies for the two lowest modes of the loaded reed. In the lowest loaded mode, the load rotates in the same sense as the reed, whereas in the next higher loaded mode, the load rotates in the opposite sense relative to the motion of the reed. Under proper excitation, the loaded reed will vibrate in more complex modes which occur at still higher frequencies, but the two lowest modes are the ones which have been found most useful in the viscometer. In one specific apparatus, the lowest loaded mode occurred near 80, and the next higher near 800 cycles per second. Maximum efficiency and sensitivity might be expected in a viscometer using the lowest mode, since in this mode the excursion of the blade in the liquid is greater and the viscous damping due to the liquid is higher with respect to the mechanical resistance of the reed and its supports. However, it is not possible to use this mode in all cases, because the vibrations at 80 C. P. S. may be transmitted through the entire frame and case, thus making the mechanical resistance dependent on how and where the viscometer is held. Such a condition makes it difficult to obtain reproducible measurements of viscosity. At 800 C. P. S., however, difficulties of this sort are not serious. Therefore, this mode will frequently be the one selected.

In the circuit portion of the apparatus of Fig. 1, there is provided a source of direct current for magnetic polarization, a source of variable frequency fluctuating current for driving the reed, a vacuum tube voltmeter for measuring the voltage generated by the barium titanate blocks, and a feedback network for controlling the frequency at which the reed is driven. The driving current must be variable in frequency because, as already explained, the frequency of resonance is shifted by a small amount when the blade is immersed in a liquid, and the driving frequency must always coincide with the resonant frequency of the reed-blade-liquid system. Since a manual adjustment of the frequency for each measurement of viscosity would be difficult to make accurately, as well as time-consuming and inconvenient, the electromechanical vibrating system of the present invention is incorporated in a self-oscillating circuit which automatically drives the system at its resonance regardless of the frequency required, within reasonable limits.

The sinusoidal voltage generated by the barium titanate blocks 26 as a result of motion of the reed is amplified by a preamplifier stage 28. This stage 28 is conventional, and may comprise a triode 30 having its grid 32 connected directly to the barium titanate blocks 26.

The output voltage of the preamplifier 28 is applied to two separate circuits; a circuit 34 for furnishing driving current to the electromechanical system 18, and a vacuum tube voltmeter circuit 36 for measuring the preamplifier output.

In the driver circuit 34, the preamplifier output voltage is further amplified and converted into square waves by a two section amplifier 38. The square-wave output of the amplifier 38 is supplied to an amplifier tube 40, which is connected in series with the coil 24 of the electromagnetic driving system 18. Thus, the direct current drawn by the amplifier 40 provides the polarizing current for the pole piece 14, with a fluctuating component superimposed. In this way, there is provided a complete feedback loop, wherein motion of the reed 10 generates a voltage which is amplified and returned to the driving system 18 to furnish driving power, so that the system will be self-oscillating.

Since the driving system is electromagnetic and the pickup is piezoelectric, the driving current in the coil 24 and the voltage generated by the barium titanate blocks 26 will be 90 degrees out of phase when the reed 10 vibrates at its resonance. In order to have the frequency of oscillation coincide with the resonant frequency of the mechanical system, this 90 degrees phase discrepancy must be corrected. This is done electrically by a simple R–C network, comprising the capacitance of the barium titanate blocks 26 and the grid resistor 42 of the preamplifier 28. The R–C network alone can give a maximum phase shift of 90 degrees. Actually, due to other phase shifts in the circuit, a total compensation somewhat greater than 90 degrees is required, and the necessary additional amount is provided by the R–C network comprising the coupling capacitor 44 and the grid resistor 46 for the amplifier 38 in the driver circuit 36. With these phase corrections, the system will oscillate at the mechanical resonance of the system under all conditions except those imposed by immersing the blade 16 in such highly viscous liquids (say, those having coefficients of viscosity greater than about 2000 centipoises), that the reed oscillates in one of the higher-frequency modes.

It can be seen that it is important to maintain a constant current through the coil 24 of the elecromagnetic driving system 18, regardless of the load imposed on the blade 16 by the liquid 20, in order to properly maintain calibration. This requirement is met by converting the amplified alternating voltage from the preamplifier 28 into square waves whose amplitude is independent of the amplitude of motion of the reed. It will be understood that this may require one or more additional amplifier stages in the driver circuit 34, but for simplicity only one double section stage has been shown. The magnitude of the driving currents can be altered when desired, by putting additional resistance in series with the coil 24, as by means of a variable resistor 48 in the cathode circuit of the pentode 40.

In the voltmeter section 36, the amplified alternating voltage from the preamplifier 28 is amplified further in a pair of tubes 50, 52, and then is applied to a diode rectifier 54. Approximately 17 decibels of negative feedback around the 2-stage amplifier 50, 52 makes this portion of the circuit highly stable. The diode circuit and a microammeter 56 form a conventional peak reading vacuum tube voltmeter for measuring the voltage generated by the barium titanate blocks.

The viscometer is calibrated by noting the meter readings when the blade is immersed in liquids of known density and viscosity. A meter indication may be converted into proper value of $\mu\rho$ by reference to a calibration curve, or a meter scale giving the value of $\mu\rho$ directly may be made. A sample of liquid as small as .5 ml. is sufficient, provided it is held in a container which will receive the blade with ample clearance. Obviously, the viscometer may be used with infinitely large samples so long as they present a free surface into which the blade can be immersed.

When it is desired to make viscosity measurements with smaller amplitudes of vibration of the blade, the procedure outlined above is followed, with the meter being calibrated to correspond to a different setting of the amplitude control resistor 48.

Liquids having coefficients of viscosity greater than about 2000 cps. may damp the vibrating system so severely as to prevent self-oscillation at the proper frequency. In such a case an external oscillator can be used to furnish the driving current. The frequency of the oscillator would be adjusted for a maximum deflection of the meter with the blade in air. This frequency adjustment is critical and must be made carefully. With the blade immersed in the liquid, the frequency again would be adjusted for maximum meter deflection, but this adjustment is not critical because the high damping provided by the liquid in such cases makes the resonance curve very broad. This maximum meter reading will give the proper value of $\mu\rho$ for the liquid, if the meter is suitably calibrated.

The viscometer shown in Fig. 1 is capable of yielding significant results for values of $\mu\rho$ in the range between .1 and 100,000, $\mu$ being in centipoises and $\rho$ in grams per cubic centimeter. Naturally, with an instrument encompassing such a wide range the precision cannot be perfect. Somewhat better precision can be obtained, however, if only comparative measurements between liquids within a limited range are desired. For such measurements, the full-scale adjustment is made with the blade immersed in the liquid having the smaller $\mu\rho$ of the group of liquids being compared. The more viscous liquids will then give deflections less than full-scale, and a calibration chart can be made for the range under study if desired.

If a process is being investigated in which the viscosity changes with time, the blade may be left immersed in the liquid and meter readings noted as the process advances. The D. C. voltage developed by the diode rectifier in the metering circuit may be amplified by an external amplifier and used to operate a recording galvanometer. In this way a permanent and continuous record can be made.

In principle, any direct means for measuring either the amplitude or the velocity of the vibrating plate should be satisfactory. Thus, piezoelectric, electrostatic, straingauge, magnetic and dynamic types of pickup could be employed. It has been found, however that the proximity of a dynamic pickup coil to a driver coil in vibrating systems of this type gives rise to inductive electrical pickup between the coils which frequently interferes with the voltage induced as a result of motion, thus imposing a practical limitation on this type of pickup.

In Fig. 3, there is shown an alternative type of driving system for the vibratory element. The structure shown in Fig. 3 also includes an electrostatic signal generator instead of a piezoelectric signal generator.

In the driver system of Fig. 3, one end of the reed 10 is clamped to a supporting block 60 of conductive material. The block 60 is secured to a support member 62. A magnet structure comprising a cylindrical pole piece 64 and centrally disposed permanent magnet 66 also is secured to the support 62 adjacent the free end of the reed 10.

A coil 68 is wound on a coil form 70 on the reed 10 so as to extend into the circular gap 76 between the pole piece 64 and magnet 66. The structure thus comprises a dynamic drive system, wherein alternating voltage applied to the coil 70 from a circuit such as the driver circuit 34 of Fig. 1 will cause the coil 70 to move in and out of the gap 76, thereby imparting vibratory movement to the reed 10 and blade 12.

The signal generating means in Fig. 3 comprises an electrostatic pickup, including a stationary electrode 72 cooperable with the reed 10 to provide an alternating output voltage. Either the electrode 72 or the supporting block 60 can be connected to a suitable unidirectional voltage source (not shown) to generate an alternating voltage in a circuit connected to the reed 10 and electrode 72 as the reed 10 moves toward and away from the electrode 72.

Among the features which characterize the operation of the vibrating-plate viscometer disclosed herein, the following can be listed:

(1) Significant measurements in the viscosity range of .1 centipoise to 100,000 centipoises are possible with a single instrument.

(2) Meter indications can be given directly in terms of $\mu\rho$.

(3) Practically instantaneous indications are given.

(4) Continuous readings may be made or automatically recorded as the viscosity of a liquid changes with time.

(5) Measurements can be made in the temperature range from 100° C. to indefinitely low temperatures.

(6) The volume of liquid sample which may be used ranges from a minimum of about .5 ml. to indefinitely large volumes.

(7) The viscometer blade can be easily and quickly cleaned following or preceding a test.

(8) By averaging five or more independent measurements, values of $\mu$ accurate within ±5 per cent can be obtained. Higher precision is possible if only relative measurements of similar liquids is desired.

What is claimed is:

1. In a viscometer of the type comprising a vibratory element adapted to be immersed in a sample of a liquid to be tested to set up shear waves in said sample and including fluctuating-current-responsive driving means for setting up vibratory motion of said vibratory element and means to generate a fluctuating current in response to vibration of said vibratory element, the improvement which comprises an amplifying circuit connecting said current generating means to said driving means to supply to said driving means an amplified fluctuating current corresponding in frequency to the fluctuating current output of said current generating means, said amplifying circuit comprising means to limit automatically said amplified fluctuating current to a constant predetermined value independent of the viscosity of said liquid to eliminate differences in the amplitudes of the currents supplied to said driving means for different amplitudes of movement of said vibratory element.

2. In a viscometer of the type wherein liquid viscosity is measured by measuring the damping effect of a liquid on the vibratory motion of a vibratory element immersed in said liquid, the combination of fluctuating-current-responsive driving means coupled to said element for vibrating said element at a frequency determined by the frequency of fluctuation of the current supplied thereto, a first circuit connected to said vibrating means for generating and supplying to said vibrating means a variable frequency fluctuating current, a second circuit including current generating means responsive to vibration of said vibrating element for generating a fluctuating current in which the frequency of fluctuation corresponds to the frequency at which said element vibrates, and means between said circuits for controlling the frequency of said currents generated in said first circuit in accordance with the frequency of said currents generated in said second circuit, said last-mentioned means comprising means to limit automatically said currents generated in said second circuit to a constant predetermined value independent of the damping effect of said liquid on said vibratory element.

3. In a viscometer of the type wherein a vibratory element adapted to be immersed in a liquid test sample is caused to vibrate in response to the application of fluctuating current to an electromechanical energizing system coupled with said element, and wherein means are provided for generating a fluctuating current representative of vibratory motion of said element, the improvement which comprises an amplifier circuit connected to said current generating means to amplify the fluctuating currents generated therein, and means connected between said amplifier and said energizing system to furnish to said system fluctuating energizing current of frequency determined by the frequency of vibration of said element, said last-mentioned means comprising means to limit automatically said current furnished to said system to a predetermined value independent of the viscosity of said sample.

4. In a viscometer of the type including a vibratory reed fixed at one end and free to vibrate at the other and having secured to said free end a plate member adapted to be immersed in a liquid test sample to set up shear waves therein, the combination of a fluctuating-current-responsive electromagnetic driving system associated with said reed for imparting vibratory motion to said reed, means associated with said reed for generating a fluctuating current of frequency determined by the frequency of vibration of said reed, an amplifier connected to said current generating means to amplify fluctuating currents generated therein, and means connecting said amplifier to said driving system to supply to said driving system amplified fluctuating current from said amplifier, said last-mentioned means including means to limit automatically said last-mentioned current to a predetermined value independent of the viscosity of said sample.

5. In an energizing circuit for a vibrating plate viscometer of the type wherein vibratory movement is imparted by a current responsive driving system to a blade element adapted to be immersed in a liquid test sample and wherein means are coupled to said blade element to generate a fluctuating current in which the frequency and amplitude of the fluctuations correspond to the frequency and amplitude of the vibratory movements of said blade element, the combination of an amplifier circuit coupled to said current generating means to amplify currents generated therein, means in said amplifying circuit to equalize automatically the amplified current output thereof with different amplitude inputs, and connections from said amplifier to said driving system to supply current from said amplifier to said driving system.

6. In a vibrating plate viscometer, the combination of a reed clamped at one end and having its other end free for vibratory movement, a fluctuating-current-responsive electromagnetic driving system for imparting vibratory motion to said free reed end, a substantially circular flat plate member extending from said free reed end and having its principal surfaces substantially parallel to the plane of vibratory motion of said free reed end, means responsive to the vibration of said reed to generate a fluctuating current, and means to amplify and to limit automatically said fluctuating current to a constant predetermined value independent of the amplitude of vibration of said reed.

7. A viscometer as defined in claim 6 wherein said driving system comprises a magnetic circuit having an air gap therein, a coil support on said reed adjacent said free end and extending into said air gap, and a coil wound on said coil support.

8. A viscometer as defined in claim 6 wherein said driving system comprises a magnetic circuit including said reed.

9. A viscometer as defined in claim 6 including means associated with said reed for generating a fluctuating current in response to vibratory movement of said reed, and said current generating means comprises said reed and a stationary electrode adjacent to and spaced from said free reed end.

10. A viscometer as defined in claim 6 including means associated with said reed for generating a fluctuating current in response to vibratory movement of said reed, and said current generating means comprises a piezoelectric element fixed to said reed to generate a fluctuating voltage in response to flexing of said reed.

11. In a vibratory system for a vibrating plate viscometer, the combination of a magnetic pole piece, a vibratory reed clamped at one end to said pole piece and having its other end free for vibratory movement, a flat, substantially circular blade member extending from said free end of said reed and having surfaces substantially parallel to the plane of vibratory motion of said free reed end, a magnetic circuit including said pole piece and said reed, said circuit having an air gap adjacent said free reed end, a coil member on said pole piece for conducting fluctuating current to establish a fluctuating flux in said magnetic circuit, and means responsive to the vibration of said reed to limit automatically said fluctuating current to a constant predetermined value independent of the amplitude of vibration of said reed.

12. In a vibrating plate viscometer, a shear plate comprising a substantially circular flat disc adapted to be immersed in a liquid test sample and mounted for vibratory movement in a plane parallel to the principal surfaces thereof.

References Cited in the file of this patent

UNITED STATES PATENTS

| Number | Name | Date |
| --- | --- | --- |
| 2,340,507 | Bjork | Feb. 1, 1944 |
| 2,550,052 | Fay | Apr. 24, 1951 |

FOREIGN PATENTS

| Number | Country | Date |
| --- | --- | --- |
| 627,543 | Great Britain | Aug. 10, 1949 |